US012791931B2

(12) United States Patent
Xia et al.

(10) Patent No.: US 12,791,931 B2
(45) Date of Patent: Nov. 10, 2026

(54) SELF-STORING SYSTEM

(71) Applicants: Meihua Xia, Shenzhen City (CN); Jun Lu, Shenzhen City (CN)

(72) Inventors: Meihua Xia, Shenzhen City (CN); Jun Lu, Shenzhen City (CN)

( * ) Notice: Subject to any disclaimer, the term of this patent is extended or adjusted under 35 U.S.C. 154(b) by 134 days.

(21) Appl. No.: 18/427,485

(22) Filed: Jan. 30, 2024

(65) Prior Publication Data

US 2024/0295805 A1 Sep. 5, 2024

Related U.S. Application Data

(60) Provisional application No. 63/442,392, filed on Jan. 31, 2023.

(51) Int. Cl.
*G03B 21/58* (2014.01)
*F16M 11/34* (2006.01)

(52) U.S. Cl.
CPC ............. *G03B 21/58* (2013.01); *F16M 11/34* (2013.01)

(58) Field of Classification Search
CPC ........ G03B 21/58; G03B 21/56; F16M 11/34; E06B 9/56
See application file for complete search history.

(56) References Cited

U.S. PATENT DOCUMENTS 4,017,152 A * 4/1977 Allen ..................... G03B 21/58 248/165
4,110,003 A * 8/1978 Zinn ...................... G03B 21/58 359/461
4,832,296 A * 5/1989 Schnepp .............. G01C 15/004 248/188.5
6,052,227 A * 4/2000 Niwa ..................... G03B 21/58 359/461
6,191,886 B1 * 2/2001 Sinkoff .................. G03B 21/58 359/461
6,249,377 B1 * 6/2001 Takamoto .............. G03B 21/58 359/461
6,297,905 B1 * 10/2001 Takamoto .............. G03B 21/58 359/461
6,830,517 B1 * 12/2004 Ciraolo .................... A63G 9/12 403/313
6,873,458 B1 * 3/2005 Bakkom ................ G03B 21/58 359/461
7,543,790 B2 * 6/2009 Starcher ................. A47B 97/08 248/463
7,623,290 B2 * 11/2009 Liang ..................... G03B 21/56 359/461
8,274,737 B2 * 9/2012 Wang ..................... G03B 21/58 359/461
11,220,834 B1 * 1/2022 Corriveau .............. G03B 21/58
12,454,933 B2 * 10/2025 Borigas ................... F03B 13/20

(Continued)

*Primary Examiner* — Beth A Aubrey
(74) *Attorney, Agent, or Firm* — The Law Office of Austin Bonderer, PC; Austin Bonderer

(57) ABSTRACT

A self-storing system that has a container that partially defines a receiving space and one or more bases coupled to the container. Each base comprises two or more base extensions, and the self-storing system is configured to move between a storage position to a deployed position. In the storage position the one or more bases are located within the receiving space. In the deployed position the two or more base extensions extend from the container and out of the receiving space.

21 Claims, 5 Drawing Sheets

(56) References Cited

U.S. PATENT DOCUMENTS

| | | | | |
|---|---|---|---|---|
| 2002/0030027 | A1* | 3/2002 | Welsch | A47B 43/00 211/187 |
| 2004/0182806 | A1* | 9/2004 | Figueroa | A47H 1/122 211/105.4 |
| 2007/0121206 | A1* | 5/2007 | Liang | G03B 21/56 359/443 |
| 2013/0270784 | A1* | 10/2013 | Graffis | B62B 1/12 280/30 |
| 2019/0049834 | A1* | 2/2019 | Mathieson | G09F 1/12 |
| 2020/0022269 | A1* | 1/2020 | Liao | F16M 11/04 |
| 2020/0080369 | A1* | 3/2020 | Achiel | E06B 9/32 |
| 2020/0292930 | A1* | 9/2020 | Long | G03B 21/58 |
| 2021/0025191 | A1* | 1/2021 | Volin | E04H 15/005 |
| 2021/0116793 | A1* | 4/2021 | Ho | G03B 21/145 |
| 2022/0266953 | A1* | 8/2022 | Cao | E06B 9/322 |
| 2023/0373301 | A1* | 11/2023 | Elder | B60K 35/00 |
| 2023/0383896 | A1* | 11/2023 | Davidson | F16M 11/041 |

* cited by examiner

SELF-STORING SYSTEM

BRIEF DESCRIPTION OF THE DRAWINGS

The accompanying drawings are intended for better understanding of the embodiments of the present invention, and constitute a part of this specification, to exemplify the embodiments of the present invention and illustrate the principle of the present invention in combination with the text. Apparently, the accompanying drawings in the following descriptions show merely some embodiments of the present invention, and a person of ordinary skill in the art may derive other drawings from these accompanying drawings without creative efforts. In the drawings.

DETAILED DESCRIPTION

Figure 1:
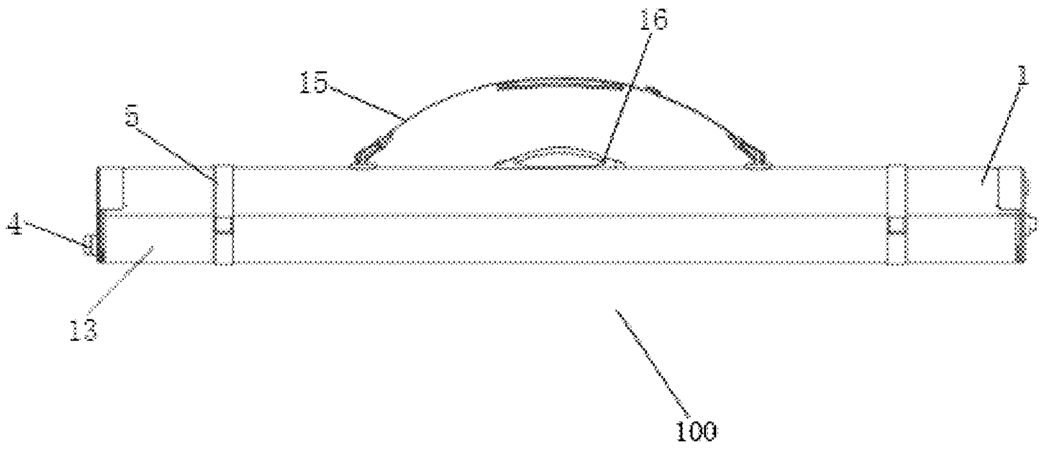
FIG. 1 is an embodiment of a self-storing system in a storage position.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein. It should be noted that references to "an" or "one" embodiment in this disclosure are not necessarily to the same embodiment, and such references mean at least one.

Several definitions that apply throughout this disclosure will now be presented.

The term "coupled" is defined as connected, whether integral with, directly attached, or indirectly attached through intervening components, and is not necessarily limited to physical connections. The connection can be such that the objects are permanently connected or releasably connected. The term "electrically coupled" is defined as being in structural electrical contact, whether directly or indirectly through intervening components, to allow the flow of electrons between the respective elements. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "about" in relation to quantitative measurements (unless otherwise stated) comprises, but is not limited to, the disclosed measure and measurements about the disclosed measure in terms of its disclosed degree. For example, "about 90" would at least include 80-100, whereas "about 90.0" would at least include 89.0-91.0. The term "comprising" means "including, but not necessarily limited to"; it specifically indicates open-ended inclusion or membership in a so-described combination, group, series and the like.

It should be understood that terms used and specific structural and functional details disclosed herein are merely intended for representatively describing specific embodiments. Instead, the present invention may be specifically embodied by many alternatives, and should not be construed to be limited by the embodiments described herein.

The present invention is described in detail below with reference to the accompanying drawings and alternative embodiments.

Figure 2:
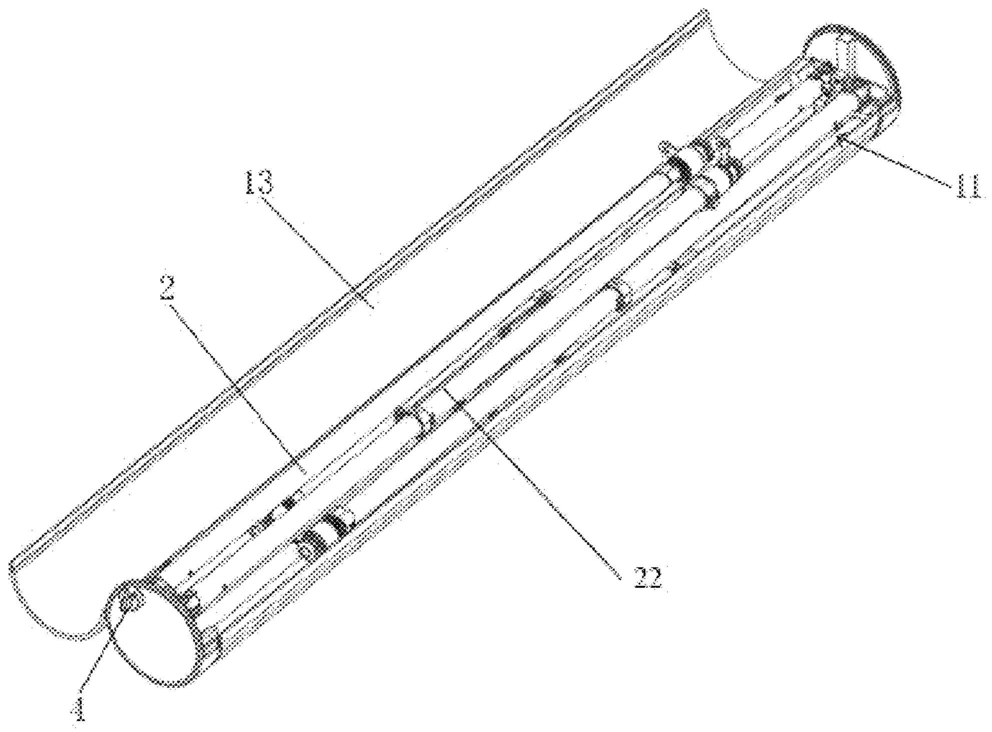
FIG. 2 is an embodiment of a self-storing system with the cover is open.
Figure 3:
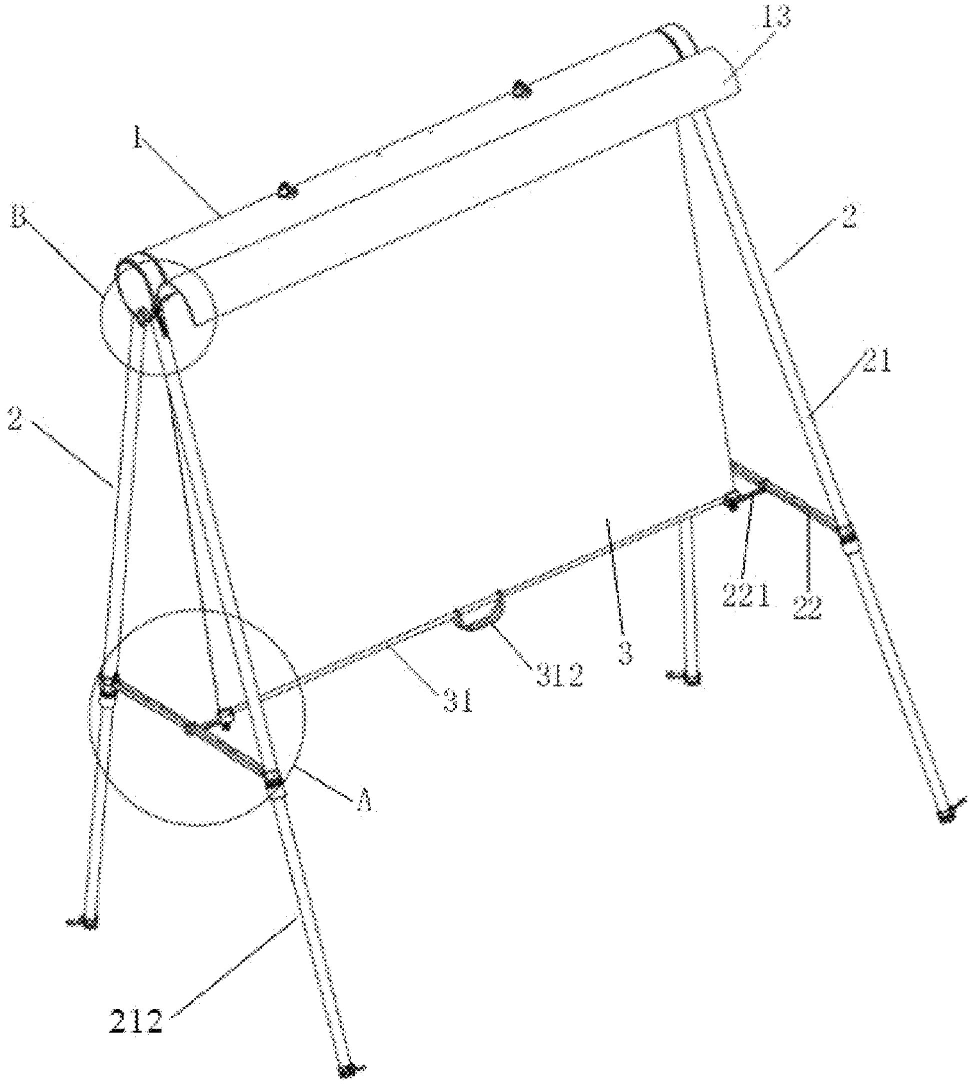
FIG. 3 an embodiment of a self-storing system in a deployed position.

FIGS. 1 to 3 show embodiments of the self-storing system 100. In some embodiments, the self-storing system 100 comprises: a container 1, a base 2 and a screen 3. In some embodiments, the container 1 is defines a receiving space 11 in which both the base 2 and the screen 3 are received. The base 2 and the screen 3 can be arranged in the receiving space 11 in the storage position or extend out from the receiving space 11 in the deployed position.

In some embodiments, the self-storing system 100 comprises a container 1 which defines the receiving space 11. In the storage position, the base 2 and the screen 3 are respectively secured in the receiving space 11, and the cover 13 is closed to help provide a convenient way to store or carry.

In some embodiments, when moving from the self-storing system 100 from storage position to deployed position, one or two of the bases 2, accommodated in the receiving space 11, are actuated such that it extends out of the of the receiving space 11. The base extensions 21 can then be placed on a surface. In some embodiments, the base extensions 21 comprise extendable segments that can be adjusted to determine the height of the self-storing system 100 in the deployed state.

Referring to the embodiments shown in FIG. 2, the container 1 comprises a cover 13, and the cover 13 is used for limiting access in and out of the receiving space 11. In some embodiments, the cover 13 can be rotationally coupled to the container 1. In some embodiments, the cover 13 is rotationally coupled to the container 1 by fabric, a rotating shaft, a hinge, and/or a flexible material such as silica gel. In some embodiments, the container 1 is cylindrical. In some embodiments, self-storing system 100 comprises one or more securing members 5 to secure the cover 13 to the container 1. In some embodiments, the one or more securing members 5 are located about the container 1 and the cover 13 when in the secured position. In some embodiments, the container 1 is provided with a strap 15 and a handle 16 to easily grab and carry the self-storing system 100.

In some embodiments, the base 2 is rotatably fixed to the container 1. In some embodiments, the base 2 is rotatably coupled to the inside of the container 1, so that the base 2 can be accommodated in the receiving space 11 and then rotated and extend from the receiving space 11. In some embodiments, there are two bases 2, and the two bases 2 are respectively coupled to two ends of the container 1, to stably support the screen 3. In some embodiments, as shown in FIG. 3, each base 2 comprises base extensions 21, where the base extensions 21 can be accepted in the receiving space 11, and the base extension 21 can be moved to be farther away or closer each other. In some embodiments, the base extensions 21 are independently rotatably coupled to the container 1, so that the base extensions 21 can be accommodated in the receiving space 11 as well as unfolded from the receiving space 11. In some embodiments, the base extension 21 can be rotated, so that the base extensions 21 can be spaced apart from each other when in the deployed position, and can be moved closer to each other and placed in the receiving space 11 when in the storage position, thereby facilitating packaging.

Figure 6:
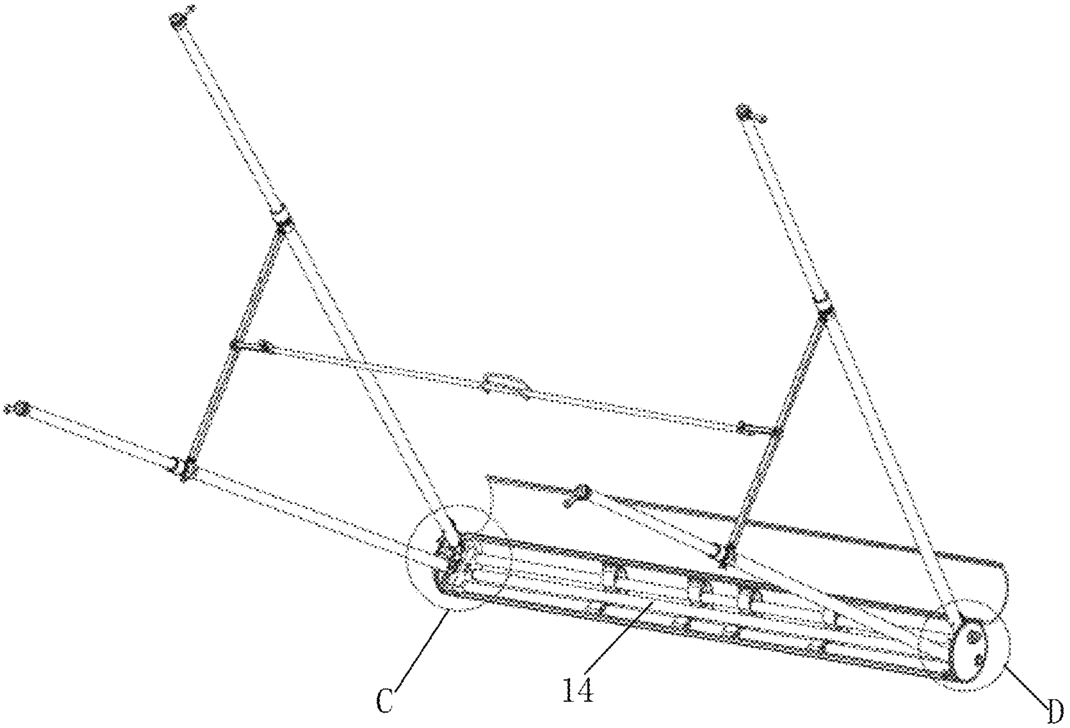
FIG. 6 an embodiment of a self-storing system in a deployed position from a different angle.
Figure 7:
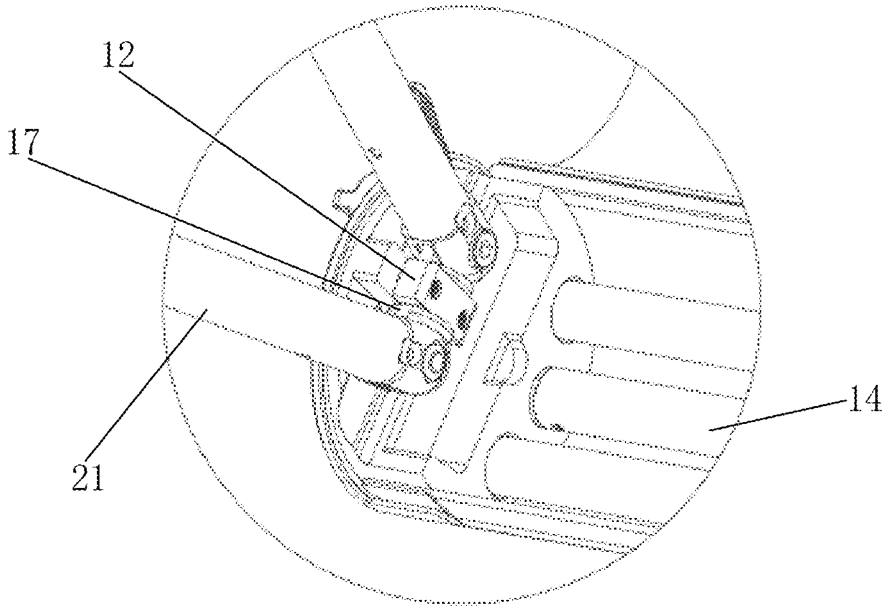
FIG. 7 is a partially enlarged view of the area indicated as C in FIG. 6.

As shown in FIG. 6 and FIG. 7, in some embodiments, base lock engagements 12 are provided at the two ends of the receiving space 11. In some embodiments, joints 17 are rotatably coupled to both sides of the base lock engagement 12. In some embodiments, the base extensions 21 are respectively rotatably coupled to the joint 17. In this solution, joint 17 are rotatably coupled to the base lock engagement 12, and the base extension 21 are respectively rotatably coupled to the joint 17, so that the base extension 21 can be rotated to approach each other and rotatively accommodated in the receiving space 11, thereby implementing a simple structure and facilitating packaging of the base extensions 21.

Figure 4:
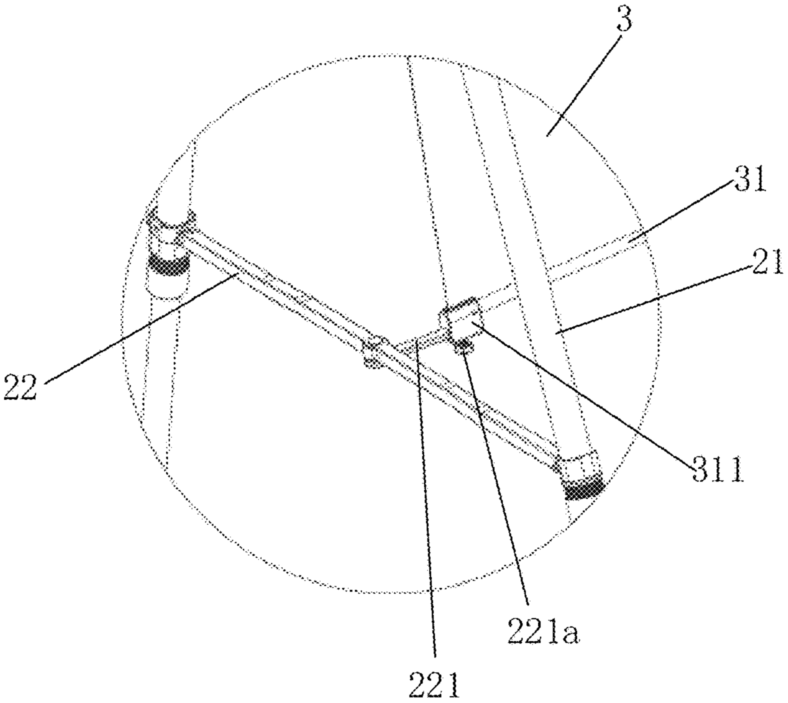
FIG. 4 is a partially enlarged view of the area indicated as A in FIG. 3.

As shown in FIG. 3 and FIG. 4, in some embodiments, the base 2 comprises a stabilizer member 22. In some embodiments, the stabilizer member 22 is arranged between the base extension 21, and two ends of the stabilizer member 22 are respectively rotatably coupled to the base extension 21. In some embodiments, the stabilizer member 22 is permanently secured to one base extension 21 and able to slide over or secure to the other base extension 21. This will allow the stabilizer member 22 to move between the deployed position to the storage position (as seen in FIG. 2). In some embodiments, the stabilizer member 22 is additionally located between two base extensions 21, and has two ends respectively rotatably coupled to the base extension 21. When the base extensions 21 are unfolded, the stability of the base extensions 21 can be improved by the one or more stabilizer members 22, and when being plated in the storage position, the base extensions 21 and the stabilizer members 22 can be folded and placed in the storage position.

Figure 8:
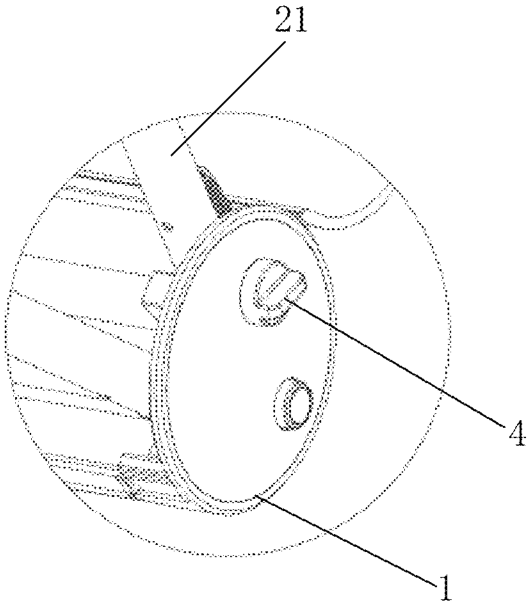
FIG. 8 is a partially enlarged view of the area indicated as D in FIG. 6.
Figure 9:
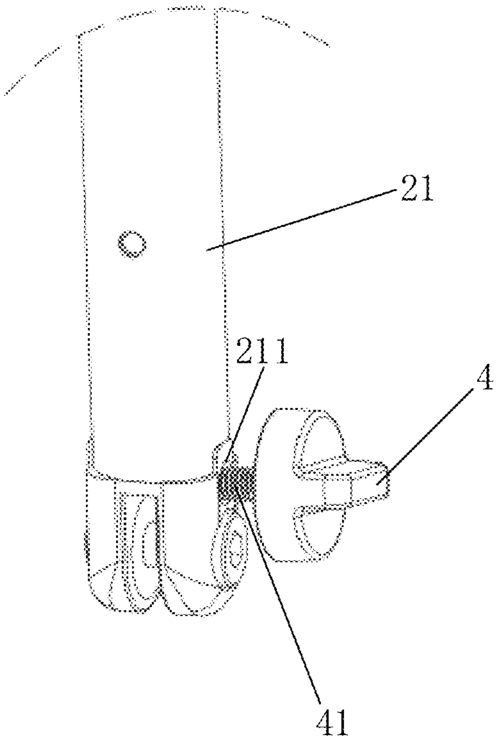
FIG. 9 an embodiment of a locking hole and a locking member interacting with each other.

As shown in FIG. 6, FIG. 8, and FIG. 9, in some embodiments, the screen 3 comprises a base lock 4. In some embodiments, the base lock 4 comprises a engagement portion 41. In some embodiments, the engagement portion 41 is threadedly coupled to an end of the container 1 and penetrates through the end of the container 1. In some embodiments, the base extension 21 defines an engagement opening 211 corresponding to the engagement portion 41. In some embodiments, when the base extensions 21 are unfolded and enter a deployed position, the base lock 4 is actuated, so that the engagement portion 41 is inserted into the engagement opening 211, thereby locking the base extension 21. In some embodiments, when used with the stabilizer member 22, the base lock 4 only needs to lock one base extension 21 per side to keep the base extensions 21 in place.

In some embodiments, as shown in FIG. 4, a screen base 31 is provided at a bottom of the screen 3. In some embodiments, a lateral extension 221 is rotatably coupled to the stabilizer member 22. In some embodiments, the lateral extension 221 is located at or substantially at the center of the stabilizer member 22. In some embodiments, two ends of the screen base 31 are respectively detachably coupled to the lateral extension 221. In some embodiments, the screen base 31 at the bottom of the screen 3 is detachably coupled to the lateral extension 221, and therefore, when being unfolded from the receiving space 11, the screen 3 can be coupled to the lateral extension 221, securing the screen 3 in an unfolded state. In some embodiments, during packaging, the screen base 31 and the lateral extension 221 are disassembled to package the screen 3. In some embodiments, the lateral extension 221 is rotatably coupled to the stabilizer member 22, to facilitate connection and adjustment of the stabilizer member 22 and the screen 3 and also facilitate folding and packaging of the lateral extension 221. In some embodiments, screen securing members 311 are located at one or more locations along the screen base 31. In some embodiments, holes are provided on the screen securing member 311, and the lateral extension 221 is detachably coupled to the hole through a fastener 221*a*. In some embodiments, the fasteners 221*a* are threaded. Specifically, a screen handle 312 is provided on the screen base 31 to easily pull the screen 3 out from the receiving space 11.

Figure 5:
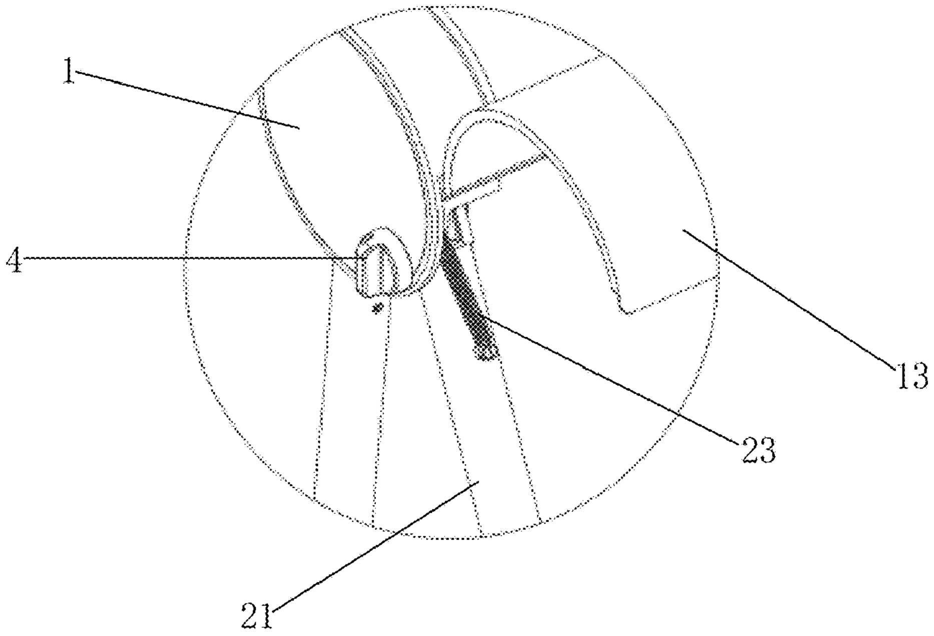
FIG. 5 is a partially enlarged view of the area indicated as B in FIG. 3.

As shown in FIG. 5, in some embodiments, the base 2 comprises a spring 23 that is coupled to the container 1 and the base extension 21. In some embodiments, when the base extension 21 is the deployed state, the spring 23 is stretched. In some embodiments, the spring 23, when the self-storing system 100 is being folded and packaged, the base extension 21 quickly retracts into the receiving space 11 due to elastic force of the spring 23, thereby implementing quick and convenient packaging.

As shown in FIG. 3, in some embodiments, each base extension 21 comprises one or more telescopic sections 212 that can be extended, to adjust a supporting height of the screen 3. In some embodiments, each base extension 21 has two or three telescopic sections 212. In some embodiments, the telescopic sections 212 are coupled with a telescopic joint. In some embodiments, the telescopic joint is actuated by rotation.

As shown in FIG. 6 and FIG. 7, in some embodiments, a winding member 14 capable of winding the screen 3 is located in the receiving space 11 and fixed to the container 1. In some embodiments, the screen 3 is coupled to the winding member 14. In some embodiments, the winding member 14 is provided to wind and package the screen 3. In some embodiments, a coil spring or the like can be provided on the winding member 14 for automatic rotation and winding of the screen 3. When the screen 3 is pulled out from the receiving space 11, the coil spring accumulates force, and the winding member 14 rotates under resilience of the coil spring during packaging, to wind up the screen 3. In some embodiments, the winding member 14 is able to lock and unlock due to pulling action on the screen 3.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however it is disclosed that elements of disclosed embodiments can be switched with corresponding elements of embodiments with the same name and/or number of other disclosed embodiments.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An apparatus comprising:

a self-storing system comprising:

a container at least partially defining a receiving space;

one or more bases coupled to the container, wherein each base comprises two or more base extensions;

one or more stabilizer members, and each stabilizer member is coupled to two of the two or more base extensions wherein the self-storing system is configured to move between a storage position to a deployed position; in the storage position, the one or more bases and the one or more stabilizer members are located within the receiving space; in the deployed position, the two or more base extensions extend from the container and out of the receiving space, and the one or more stabilizer members are spaced from the container and out of the receiving space.

2. The apparatus of claim 1, wherein the self-storing system further comprises a cover coupled to the container; and in the storage position, the cover is configured to enclose the receiving space with the one or more bases therein.

3. The apparatus of claim 2, wherein the self-storing system further comprises one or more securing members configured to secure the cover in the storage position.

4. The apparatus of claim 1, wherein each base extension extends from the receiving space and projects away from each other in the deployed position.

5. The apparatus of claim 1, wherein each stabilizer member is configured to slide along at least one of the two or more base extensions when moving from the deployed position to the storage position.

6. The apparatus of claim 5, wherein each stabilizer is permanently secured to one of the two or more base extensions.

7. The apparatus of claim 1, wherein the one or more stabilizer members comprises two stabilizer members, and each stabilizer member comprises a lateral extension.

8. The apparatus of claim 7, wherein each lateral extension is rotationally coupled to one of the two stabilizer members.

9. The apparatus of claim 7, wherein in the storage position, each lateral extension, each base extension, and each stabilizer member are located in the receiving space.

10. The apparatus of claim 1, wherein each base extension comprises one or more telescopic sections.

11. The apparatus of claim 10, wherein each telescopic section is configured to be secured or loosened by rotating a telescopic joint.

12. The apparatus of claim 1, wherein in the storage position, each base extends along a first direction, and in the deployed position, each base extends along a second direction.

13. The apparatus of claim 1, wherein each base comprises a base lock engagement, and in the deployed position, the base lock engagement is configured to be secured to the container by a base lock.

14. The apparatus of claim 13, wherein the base lock engagement is located on one of the two or more base extensions of each base.

15. The apparatus of claim 13, wherein the base lock is threaded.

16. The apparatus of claim 1, wherein the self-storing system further comprises a winding member located in the receiving space and a screen attached to the winding member.

17. The apparatus of claim 16, wherein the self-storing system further comprises a screen base coupled to the screen and one or more screen securing members coupled to the screen base; and each screen securing member couples the screen base to a lateral extension in the deployed position.

18. The apparatus of claim 17, wherein each screen securing member comprises a fastener configured to secure the screen securing member to the lateral extension.

19. The apparatus of claim 18, wherein each fastener is threaded.

20. The apparatus of claim 1, wherein the one or more bases comprises two or more bases.

21. An apparatus comprising:

a self-storing system comprising:

a container at least partially defining a receiving space;

one or more bases coupled to the container, wherein each base comprises two or more base extensions and a base lock engagement;

wherein the self-storing system is configured to move between a storage position to a deployed position; in the storage position, the base lock engagement is configured to be secured to the container by a base lock; in the deployed position, the two or more base extensions and the base lock engagement extend from the container and out of the receiving space.

* * * * *